Feb. 4, 1969  S. SEIGEL ET AL  3,425,672
ADJUSTING SCREW RETAINING MEANS
Filed June 1, 1967

INVENTORS
Seymour Seigel, &
Edwin S. Shaffer
BY
C.K. Veenstra
ATTORNEY

United States Patent Office 3,425,672
Patented Feb. 4, 1969

3,425,672
ADJUSTING SCREW RETAINING MEANS
Seymour Seigel, Rochester, and Edwin S. Shaffer, Spencerport, N.Y., assignors to General Motors Corporation, Detroit, Mich., a corporation of Delaware
Filed June 1, 1967, Ser. No. 642,945
U.S. Cl. 261—23         4 Claims
Int. Cl. F02m 11/00

ABSTRACT OF THE DISCLOSURE

A four-barrel, two-stage carburetor has separate idling fuel passages for the pair of primary stage mixture conduits and a single air bleed into both idling fuel passages. An adjusting screw controlling air flow through the bleed has an extension gripped by a resilient tubing member to prevent vibrational movement of the adjusting screw.

BACKGROUND OF THE INVENTION

Internal combustion engine carburetors are often provided with threaded adjusting screws which position valves to control the flow of fuel and air and provide a properly proportioned mixture for combustion in the engine. Precise maintenance of the adjustment of the valves is generally considered necessary. However, maintenance of the adjustment is hampered by the vibration to which the carburetor and adjusting screws are subjected. In some situations, the friction of the threads on the adjustment screw is sufficient to hold the screw in proper position and maintain the valve in adjustment, but in other situations, a spring is provided to enhance the frictional engagement of the screw threads.

SUMMARY OF THE INVENTION

This invention provides simpler and less expensive means for supplementing the frictional engagement of the screw threads. A section of resilient tubing is utilized to surround and grip an axial section of the adjusting screw. The frictional engagement between the tubing and the screw body increases the resistance of the screw body to turning under the force of vibration; in addition, it is possible that the tubing may damp vibrations transmitted to the screw member.

The details as well as other objects and advantages of this invention are shown in the drawing and disclosed in the description of a preferred embodiment.

DESCRIPTION OF THE PREFERRED EMBODIMENT

Figure 1:
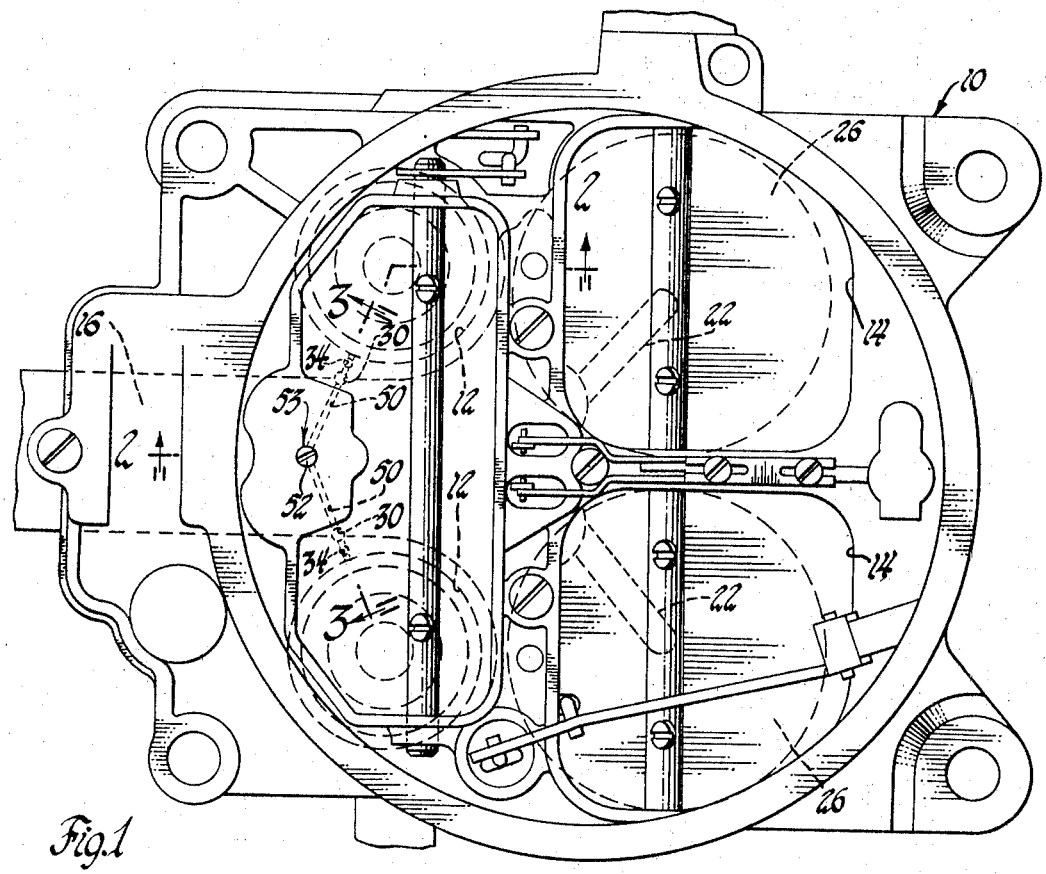
FIGURE 1 is a top plan view of a four-barrel carburetor incorporating this adjusting screw retaining means.

Referring to the drawing, a well-known and commercially available carburetor 10 includes a pair of primary mixture conduits 12 and a pair of secondary mixture conduits 14. Fuel is supplied from a fuel bowl 16 through primary main wells 18 and primary main fuel discharge passages 20 to the primary mixture conduits 12 and through secondary main wells (not shown) and secondary main discharge nozzles 22 to the secondary mixture conduits 14. Primary throttles 24 and secondary throttles 26 control flow through mixture conduits 12 and 14 and are connected so that the entire air flow for low speed, light load operation is provided by primary mixture conduits 12.

Figure 2:
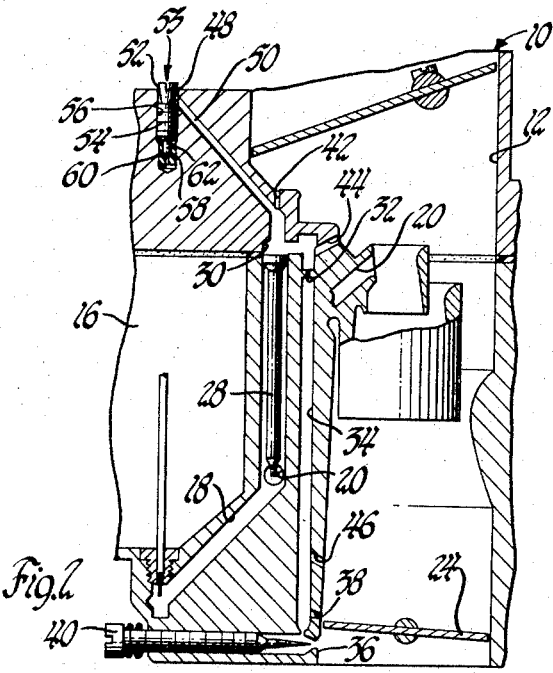
FIGURE 2 is a sectional view in elevation taken along line 2—2 of FIGURE 1 illustrating a primary mixture conduit, the associated idle fuel delivery passage, and the adjustable off-idle air bleed.
Figure 3:
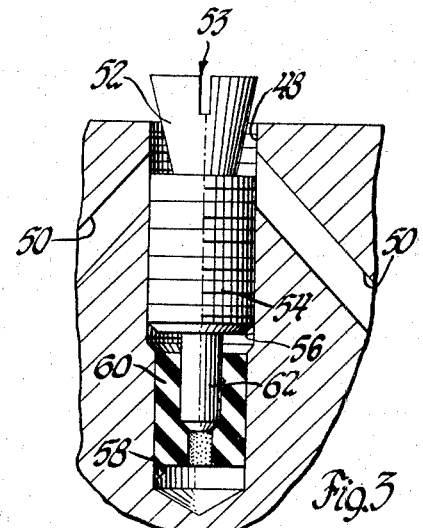
FIGURE 3 is an enlarged sectional view taken along line 3—3 of FIGURE 1 illustrating the adjusting screw and resilient tubing member.

Idle fuel delivery passages are provided only for primary mixture conduits 12. As shown in FIGURE 2 which illustrates one of the pair of identical systems, idle fuel is drawn from main well 18 through an idle metering tube 28 and a cross-over passage 30, past a restriction 32, and through a vertical passage 34 to a curb-idle discharge port 36 and an off-idle discharge port 38. When the throttle is closed as shown, all idle fuel flow is directed through port 36 at a rate controlled by a metering valve 40. As throttle 24 is opened, it traverses port 38 and subjects ports 38 to the intake vacuum. Additional idle fuel is then discharged into mixture conduit 12 from port 38. Conventional impact and volocity air bleeds 42 and 44 are provided into cross-over passage 30, and a conventional lower idle air bleed 46 is provided into vertical passage 34; these air bleeds 42, 44, and 46 allow air to be mixed with the fuel drawn from main well 18 to provide a fuel-air emulsion in the idle fuel passage and control its discharge from ports 36 and 38.

A single off-idle air bleed 48 has a pair of branch passages 50 each extending to one of the cross-over passages 30. A valve 52 controls air flow through air bleed 48 to control the off-idle air-fuel mixture discharged through port 38.

Valve 52 is formed as a portion of an adjusting screw 53 which has a threaded body 54 received in a threaded bore 56 in carburetor 10. Rotation of screw 53 results in axial movement of valve 52 and adjustment of the air flow through air bleed 48.

A smooth extension 58 below the threaded portion of bore 56 contains a resilient tubing member 60. Tubing member 60 is compressed as it is inserted in bore 58 so that it is frictionally engaged by the cylindrical wall of bore extension 58 and rotation is prevented. A projection 62 on screw 53 is received by tubing member 60. The internal diameter of tubing member 60 is less than the external diameter of projection 62 so that tubing member 60 frictionally engages projection 62. Tubing member 60 thus reduces the tendency of adjusting screw 53 to rotate under vibrational excitation and valve 52 is maintained in proper adjustment.

We claim:
1. An adjusting screw retaining arrangement comprising a body having a bore therein of predetermined diameter, at least a portion of the length of said bore having screw threads formed therein, a resilient tubing member positioned in a further portion of the length of said bore, said tubing member having a free external diameter slightly greater than the diameter of said bore whereby said tubing member is compressed and frictionally retained in said bore, said tubing having a predetermined internal dimension, an adjusting screw retained in said body, a portion of the length of said adjusting screw having screw threads formed thereon mating with the screw threads formed in said bore whereby said adjusting screw may be axially located in said bore, said adjusting screw having a further portion extending axially from the threaded portion of said screw and received within said tubing member, said further portion of said adjusting screw having an associated external dimension greater than said internal dimension of said tubing member whereby said adjusting screw is frictionally retained by said tubing member against rotation and resulting axial movement.

2. An internal combustion engine carburetor having an air bleed passage and a threaded bore adjacent said passage; means for controlling air flow through said air bleed passage comprising an adjusting member having a threaded portion received in said bore, a valve portion for variably restricting air flow through said passage, and an axially protruding portion having a predetermined external dimension; and a resilient tubing member retained in said bore against rotational movement, said tubing member having an associated internal dimension less than the external dimension of said protruding portion of said adjusting member, said tubing member receiving said protruding portion for retaining said adjusting member against rotation and resulting axial movement.

3. An internal combustion engine carburetor comprising a mixture conduit, a throttle rotatably disposed in said mixture conduit to control flow therethrough, a fuel bowl, idle fuel passage means extending from said fuel bowl, air bleed means opening into said idle fuel passage means to admit air thereto and form a fuel-air emulsion therein, said idle fuel passage means having a curb-idle discharge port opening into said mixture conduit downstream of said throttle, valve means controlling the rate of flow through said port, said idle fuel passage means also having an off-idle discharge port opening into said mixture conduit adjacent the upstream edge of said throttle and traversed by said throttle during opening movement thereof, a further air bleed opening into said idle fuel passage means, said carburetor having a bore adjacent said further air bleed, at least a portion of said bore having screw threads formed therein, adjusting means for controlling air flow through said further air bleed to thereby control the air-fuel mixture of flow through said off-idle discharge port, said adjusting means including a valve portion for restricting flow through said further air bleed and a threaded portion received in the threaded portion of said bore and an axially protruding portion having a predetermined external dimension, and a resilient tubing member secured in said bore and having an internal dimension less than the external dimension of said protruding portion of said valve member, said tubing member receiving said protruding portion and retaining said adjusting means against rotational movement.

4. The carburetor of claim 3 which further includes an additional mixture conduit, an additional throttle rotatably disposed in said mixture conduit to control flow therethrough, additional idle fuel passage means extending from said fuel bowl, additional air bleed means opening into said idle fuel passage means to admit air thereto and form a fuel-air emulsion therein, said additional idle fuel passage means having an additional curb-idle discharge port opening into said additional mixture conduit downstream of said additional throttle, and additional valve means controlling the rate of flow through said additional port, said additional idle fuel passage means also having an additional off-idle discharge port opening into said additional mixture conduit adjacent the upstream edge of said additional throttle and traversed by said additional throttle during opening movement thereof, and wherein said further air bleed also opens into said additional idle fuel passage means and wherein control of air flow through said further air bleed by said adjusting means controls the air-fuel mixture of flow through said additional off-idle discharge port.

References Cited

UNITED STATES PATENTS

| | | |
|---|---|---|
| 2,358,435 | 9/1944 | Ball. |
| 2,514,025 | 7/1950 | Bush _____ 251—297 X |
| 2,531,479 | 11/1950 | Southern et al. |
| 2,656,167 | 10/1953 | Phillips. |
| 2,970,822 | 2/1961 | Ernest. |

HARRY B. THORNTON, *Primary Examiner.*

TIM R. MILES, *Assistant Examiner.*

U.S. Cl. X.R.

251—273, 297; 261—41, 64, 121